Patented Nov. 24, 1936

2,061,544

UNITED STATES PATENT OFFICE 2,061,544

AQUEOUS SOLUTION OF ANAESTHETIC SUBSTANCES

Max Bockmühl and Willy Ludwig, Frankfort-on-the-Main, Germany, assignors to Winthrop Chemical Company, Inc., New York, N. Y., a corporation of New York No Drawing. Application June 23, 1934, Serial No. 732,180. In Germany June 28, 1933

7 Claims. (Cl. 167—52)

The present invention relates to aqueous solutions of anaesthetic substances.

For producing intralumbar anaesthesia solutions of the hydrochloride of para aminobenzoic acid-diethylaminoethylester have already been prepared with the addition of a natural colloid, such as gliadine. By the addition of the colloid there is obtained a solution whose viscosity is higher than that of the solution free from colloid whereby it is intended to avoid too rapid a mixing of the anaesthetic solution with the liquid of the patient. In order to prevent the anaesthetic liquid from rising in the liquid, its specific gravity must be adapted to that of the liquid. The known process has the drawback that the natural colloids to be used can be obtained in a pure state only by complicated processes. Furthermore it is difficult, especially when operating on a large scale, to maintain the solutions prepared with the aforesaid colloids in a clear condition. Other colloids, such as gum arabic, polyvinylalcohol and others, have the disadvantage that the specific gravity is increased in a relatively high degree simultaneously with the increase of the viscosity, in consequence whereof these solutions cannot be used.

Now we have found that water-soluble cellulose derivatives are eminently suitable for increasing the viscosity of solutions of water-soluble salts of substances having an anaesthetic action with organic hydroxy carboxylic acids, without unduly increasing the specific gravity. There may, for instance, be used methylcellulose and the hydroxyethyl derivatives thereof. If desired, various additional substances, such as alcohol, ether, preserving agents and others may be added to the solutions prepared according to the present process. As agents having an anaesthetic action there may, for instance, be used the products described in U. S. Patents No. 1,550,350, dated August 18, 1925 and No. 1,889,645, dated November 29, 1932. Salts of such anaesthetic agents with hydroxy carboxylic acids, such as citric acid, glycollic acid, lactic acid, quinic acid, have been described in our co-pending U. S. patent application Serial No. 647,695, filed December 16, 1932.

The following examples illustrate the invention, but they are not intended to limit it thereto:

(1) 12 grams of hydroxyethylmethyl cellulose are reduced into small pieces by trituration and covered with 228 cc. of boiling water, well stirred and allowed to cool. On cooling, a uniform solution is obtained.

75 grams of para-butylaminobenzoic acid-dimethylaminoethylester (base) (see U. S. Patent No. 1,889,645, dated November 29, 1932) are then caused to react at 50° C. with 56.5 grams of quinic acid in 1400 cc. of water, the solution is cooled and mixed with 500 cc. of the cellulose solution named above. There are further added 200 cc. of alcohol and the whole is made up to 9.4 liters by means of distilled water. After the solution has been allowed to stand for 24 hours it is centrifuged. There is thus obtained a clear solution ready for use having a specific gravity of 1.0009 and a viscosity of 2.2 calculated on water = 1.

Instead of hydroxyethylmethyl cellulose there may also be used methylcellulose.

(2) 59 grams of the free base of para-aminobenzoyl-diethylaminoethanol are caused to react on a steam bath with 48 grams of quinic acid in 120 cc. of water; to the solution are added 22 cc. of a solution of hydroxyethylmethyl cellulose of 4 per cent strength as described in Example 1 and 22 cc. of alcohol. The whole is made up with water to 560 cc. After 24 hours the solution is centrifuged.

(3) 59 grams of the free base of para-aminobenzoyl-diethylaminoethanol are caused to react on a steam bath with 48 grams of quinic acid in 120 cc. of water, 22 cc. of methylcellulose of 4 per cent strength and 22 cc. of alcohol are then added. The whole is made up with water to 590 cc. After 24 hours the solution is centrifuged as above described.

We claim:

1. Aqueous solutions comprising a water-soluble cellulose ether and a water-soluble salt of an acid of the group consisting of hydroaromatic and aliphatic hydroxylated carboxylic acids with a compound of the following formula:

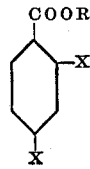

wherein $R_1$ stands for an alkamine group, one X for hydrogen, the other X for the group —$NH.R_2$, $R_2$ being an alkyl or an alkyl-alkyloxy group.

2. Aqueous solutions comprising a water-soluble cellulose ether and a water-soluble salt of an acid of the group consisting of hydroaromatic and aliphatic hydroxylated carboxylic acids with a compound of the following formula:

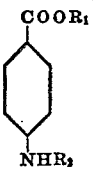

wherein $R_1$ stands for an alkamine group, $R_2$ for an alkyl group.

3. An aqueous solution comprising hydroxyethyl-methyl cellulose and the salt of para-butylaminobenzoic acid-dimethylaminoethyl ester with quinic acid.

4. An aqueous solution comprising hydroxyethyl-methyl cellulose and the salt of para-aminobenzoyl-diethylaminoethanol with quinic acid.

5. An aqueous solution comprising methylcellulose and the salt of para-aminobenzoyl-diethylamino-ethanol with quinic acid.

6. Aqueous solutions comprising a water-soluble cellulose derivative and a water-soluble salt of an organic hydroxylated carboxylic acid with a compound of the following formula

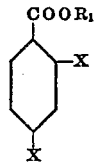

wherein $R_1$ stands for an alkamine group, one X for hydrogen, the other X for the group $NH.R_2$, $R_2$ being hydrogen or an alkyl or an alkyl-alkyloxy group.

7. Aqueous solutions comprising a water-soluble cellulose ether and a water-soluble salt of an organic hydroxylated carboxylic acid with a compound of the following formula:

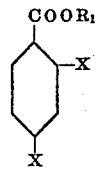

wherein $R_1$ stands for an alkamine group, one X for hydrogen, the other X for the group $NH.R_2$, $R_2$ being hydrogen or an alkyl or an alkyl-alkyloxy group.

MAX BOCKMÜHL.
WILLY LUDWIG.